United States Patent
Shiraiwa et al.

(10) Patent No.: US 6,201,893 B1
(45) Date of Patent: *Mar. 13, 2001

(54) IMAGE REPRODUCTION APPARATUS AND METHOD

(75) Inventors: Yoshinobu Shiraiwa, Machida; Yoshiro Udagawa, Miyashiro-machi; Eiichiro Ikeda, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/534,338

(22) Filed: Sep. 27, 1995

(30) Foreign Application Priority Data

Sep. 28, 1994 (JP) ................................. 6-258841
Jan. 25, 1995 (JP) ................................. 7-028844

(51) Int. Cl.[7] ............... G06K 9/00; G06K 9/40; G03K 3/08
(52) U.S. Cl. ............... 382/167; 382/274; 358/518
(58) Field of Search ............... 382/164, 165, 382/166, 167, 220, 274, 218, 162, 305; 358/518, 520, 515, 516, 523; 348/223, 225, 655

(56) References Cited

U.S. PATENT DOCUMENTS

| 4,763,186 | * | 8/1988 | Belmares-Sarabia et al. | 348/650 |
| 4,908,701 | * | 3/1990 | Udagawa | 358/520 |
| 5,282,022 | * | 1/1994 | Haruki et al. | 348/223 |
| 5,283,632 | * | 2/1994 | Suzuki et al. | 348/223 |

* cited by examiner

Primary Examiner—WenPeng Chen
(74) Attorney, Agent, or Firm—Morgan & Finnegan, LLP

(57) ABSTRACT

In an image reproduction apparatus for converting an image into an image signal that can be visibly output, and performing image reproduction processing for the image signal, at least two image signals are selected and designated from a plurality of image signals picked up by image pickup means, and predetermined information (e.g., light source information such as the color temperature, the chromaticity of a light source, or the like) is extracted by analyzing the selected and designated image signals. The image reproduction parameters used in the image reproduction processing are determined on the basis of the extracted information. In this case, the parameters are corrected by repeating the processing the number of times corresponding to the number of selected and designated image signals, thereby finally determining the image reproduction parameters.

13 Claims, 7 Drawing Sheets

IMAGE REPRODUCTION APPARATUS AND METHOD

BACKGROUND OF THE INVENTION

The present invention relates to an image reproduction method and apparatus for converting an image pickup signal obtained from an image pickup element such as an image pickup tube, a CCD, or the like into an image signal that can be visibly output as, e.g., an NTSC-RGB signal.

Conventionally, in an image reproduction apparatus such as a TV camera using an image pickup element, e.g., a CCD, some of the image reproduction parameters are normally determined on the basis of image pickup data itself in image reproduction processing for obtaining image data from the image pickup data so as to usually obtain an image which gives the same impression in appearance at least or to faithfully reproduce an image, in spite of aging of the image pickup element and color filters or a change in illumination light source. The image reproduction parameters include, e.g., the color temperature, the reproduction luminance level, and the like, and are determined by correcting the color temperature or setting the reproduction luminance level.

In a TV camera of this type, so-called white balance adjustment is normally performed to correct the above-mentioned color temperature, so that an object which is to be seen in white is seen in white. In general, this correction is performed based on the picked-up image data. More specifically, an object to be seen in white is extracted from image data, and a white balance coefficient as one of the image reproduction parameters is determined from the extracted object. Normally, in the white balance adjustment, a plurality of color component signals constituting a video signal which is output from an image pickup element, are corrected by using the white balance coefficient, with gains assigned to each of these signals. This correction makes it possible to adjust the output levels of the respective color component signals constituting a video signal of an object which is to be seen in white, to become equal to each other.

For setting the reproduction luminance level, the luminance distribution is calculated based on image pickup data, an optimal reproduction luminance level (range) is set, and the parameters are adjusted to obtain a reproduced image within the set range, thus reproducing an image.

Such a method of adjusting the color tone of an image using the white balance adjustment is effective when an object to be seen in white (an object to be photographed) is sufficiently present in a video signal obtained from, e.g., an image pickup element.

However, in a specific situation, no object to be seen in white (an object to be photographed) may be present in an image pickup signal or even an object to be seen in white may be present, is is sometimes very small.

In this situation, it is impossible to adjust the color tone by the white balance adjustment. In general, in such a situation, the video signal of the entire image pickup data is averaged in units of color components to calculate average values, and the white balance adjustment is performed using the average values. However, with this method, a color represented by the calculated average values is not always white (the color of a light source), and white balance adjustment cannot be precisely performed.

As described above, when image reproduction processing is performed to obtain an optimal reproduced image, a condition for determining parameters is generally not satisfied if the image reproduction parameters are determined based on image pickup data. More specifically, sufficient information required for determining a specific parameter such as light source information in white balance processing, cannot sometimes be obtained, and the parameters cannot be precisely determined.

In a setting of the reproduction luminance level, if the reproduction parameters of luminance levels are determined in units of individual image pickup data, a correlation or the like in terms of luminance among a plurality of image pickup data to be compared, is lost, upon execution of image comparison, image synthesis processing, or the like. This makes a comparison between reproduced images difficult, or the luminance levels lose their continuity and become unnatural in a synthesized image. For example, the above-mentioned drawbacks are encountered when an object to be picked up as one frame is divisionally picked up, in terms of the photographing area, and a plurality of image pickup data are obtained.

More specifically, as for a reproduced image obtained by determining the image reproduction parameters based on image information, since images based on the image reproduction parameters corresponding to individual image pickup data are independently obtained, a reproduced image cannot be obtained by extracting information among images by comparing and analyzing a plurality of images, like in a case wherein physical property information or the like is obtained based on luminance information. For this reason, for example, when the reflectance spatially gradually changes, the luminance distribution ranges obtained in units of individual image pickup data are different from each other. When images are reproduced by optimizing such ranges in units of image pickup data, images are reproduced in which a correlation in terms of luminance, which is originally present in each of the image pickup areas, is lost. Therefore, if one image is obtained by synthesizing images which are obtained by picking up the respective image pickup areas, an unnaturally synthesized image in which a correlation in terms of luminance is lost, is undesirably obtained.

SUMMARY OF THE INVENTION

The present invention has been made in consideration of the above-mentioned problems, and has as its object to provide an image reproduction method and apparatus, which can precisely obtain the image reproduction parameters and can attain image reproduction with high precision.

In order to achieve the above object, according to the present invention, there is provided an image reproduction apparatus for converting image pickup data obtained by image pickup means into an image signal that can be visibly output, and performing image reproduction processing for the image signal, comprising: means for storing a plurality of image pickup data picked up by the image pickup means; means for designating at least two image pickup data from the plurality of stored image pickup data; means for extracting predetermined information by analyzing the designated image pickup data; and determination means for determining image reproduction parameters to be used in the image reproduction processing on the basis of the extracted predetermined information.

According to another invention, there is provided an image reproduction apparatus for converting image pickup data obtained by image pickup means into an image signal that can be visibly output, and performing image reproduction processing for the image signal, comprising: means for storing a plurality of image pickup data picked up by the image pickup means; means for selecting at least two image pickup data from the plurality of stored image pickup data; means for selecting an image reproduction parameter group to be used in the image reproduction processing in correspondence with the image pickup data; and processing means for performing the image reproduction processing for the selected image pickup data in accordance with parameters in the image reproduction parameter group, wherein the processing means performs the image reproduction processing using the image reproduction parameter group common to the selected image pickup data the number of times matching the number of selected image pickup data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
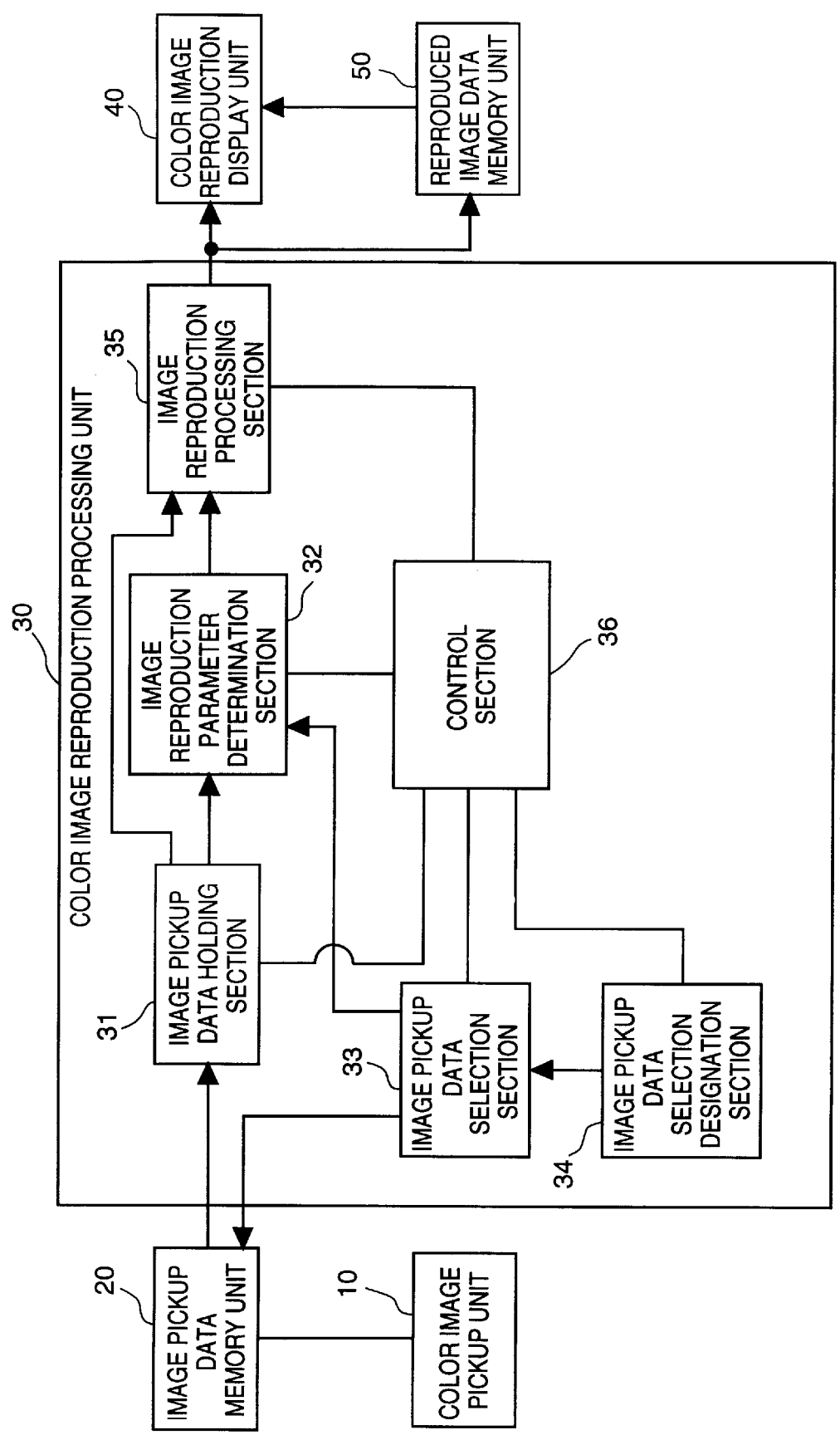
FIG. 1 is a block diagram showing the arrangement of a color image reproduction apparatus according to the first embodiment of the present invention.

The preferred embodiments of the present invention will be described in detail below with reference to the accompanying drawings.
<First Embodiment>
FIG. 1 is a block diagram showing the arrangement of a color image reproduction apparatus according to the first embodiment of the present invention.

The image reproduction apparatus is constituted by a color-image-pickup unit 10, an image-pickup-data-memory unit 20, a color-image-reproduction-processing unit 30, a color-image-reproduction-display unit 40, and a reproduced-image-data-memory unit 50.

The respective units will be described in detail below.

The color-image-pickup unit 10 comprises, e.g., a digital camera or the like. The unit 10 picks up an image of an object, and outputs the picked-up image as two-dimensional digital image pickup data.

The image-pickup-data-memory unit 20 stores the image pickup data supplied from the color-image-pickup unit 10.

The color-image-reproduction-processing unit 30 performs image reproduction processing of the image pickup data stored in the image-pickup-data-memory unit 20, converts the image pickup data into, e.g., digital NTSC-RGB data, and outputs the converted digital data. The color-image-reproduction-processing unit 30 comprises an image-pickup-data-holding section 31 for holding image pickup data from the image-pickup-data-memory unit 20, an image-pickup-data-selection section 33 for selecting image pickup data from the image-pickup-data-memory unit 20 and controlling the unit 20 to output the selected data to the image-pickup-data-holding section 31, an image-pickup-data-selection-designation section 34 for designating, e.g., a selection condition of the image pickup data to the image-pickup-data-selection section 33, an image-reproduction-parameter-determination section 32 for determining the image reproduction parameters using image pickup data selected and held in the image-pickup-data-holding section 31, an image-reproduction-processing section 35 for performing image reproduction processing of the image pickup data held in the image-pickup-data-holding section 31 using the image reproduction parameters determined by the image-reproduction-parameter-determination section 32, and a control section 36 for controlling the above-mentioned sections of the color-image-reproduction-processing unit 30.

The image reproduction parameters to be determined by the image-reproduction-parameter-determination section 32 include: parameters for describing, e.g., the color temperature, the white balance coefficient, the color component gain amount, white point information, black point information, the gamma coefficient, the gradation characteristic, the gradation conversion curve, the gradation conversion look-up table, the knee point, the dynamic range, the color range, illumination-light-source information, the chromaticity-coordinate-conversion-matrix coefficient, the spatial frequency characteristics, the black (gray) balance coefficient, the S/N ratio, the autocorrelation coefficient, the Wiener spectrum, the intensity (density) distribution, and the like; parameters indirectly or directly obtained based on the above-mentioned parameters; and the like.

The image-pickup-data-selection-designation section 34 can designate image pickup data to be selected by inputting, e.g., a file name. Note that image pickup data stored in the image-pickup-data-memory unit 20 may be displayed as a list, and image pickup data to be selected may be designated by appropriately marking image pickup data displayed in the list. In the present invention, at least two image pickup data must be designated. At this time, if the image pickup conditions (e.g., photographing date and time, environmental conditions, and the like) of image pickup data stored in the image-pickup-data-memory unit 20 are available as information, selection designation is performed with reference to these conditions.

The color-image-reproduction-display unit 40 comprises, e.g., a color video board, a monitor, and the like. The unit 40 receives a color image signal output from the color-image-reproduction-processing unit 30 or reads out a color image signal from the reproduced-image-data-memory unit 50, and displays the image signal on a display screen as a color image.

The reproduced-image-data-memory unit 50 stores image data reproduced by the color-image-reproduction-processing unit 30. The stored image data is supplied to the color-image-reproduction-display unit 40 as needed, and is displayed as a color image, as described above.

Figure 2:
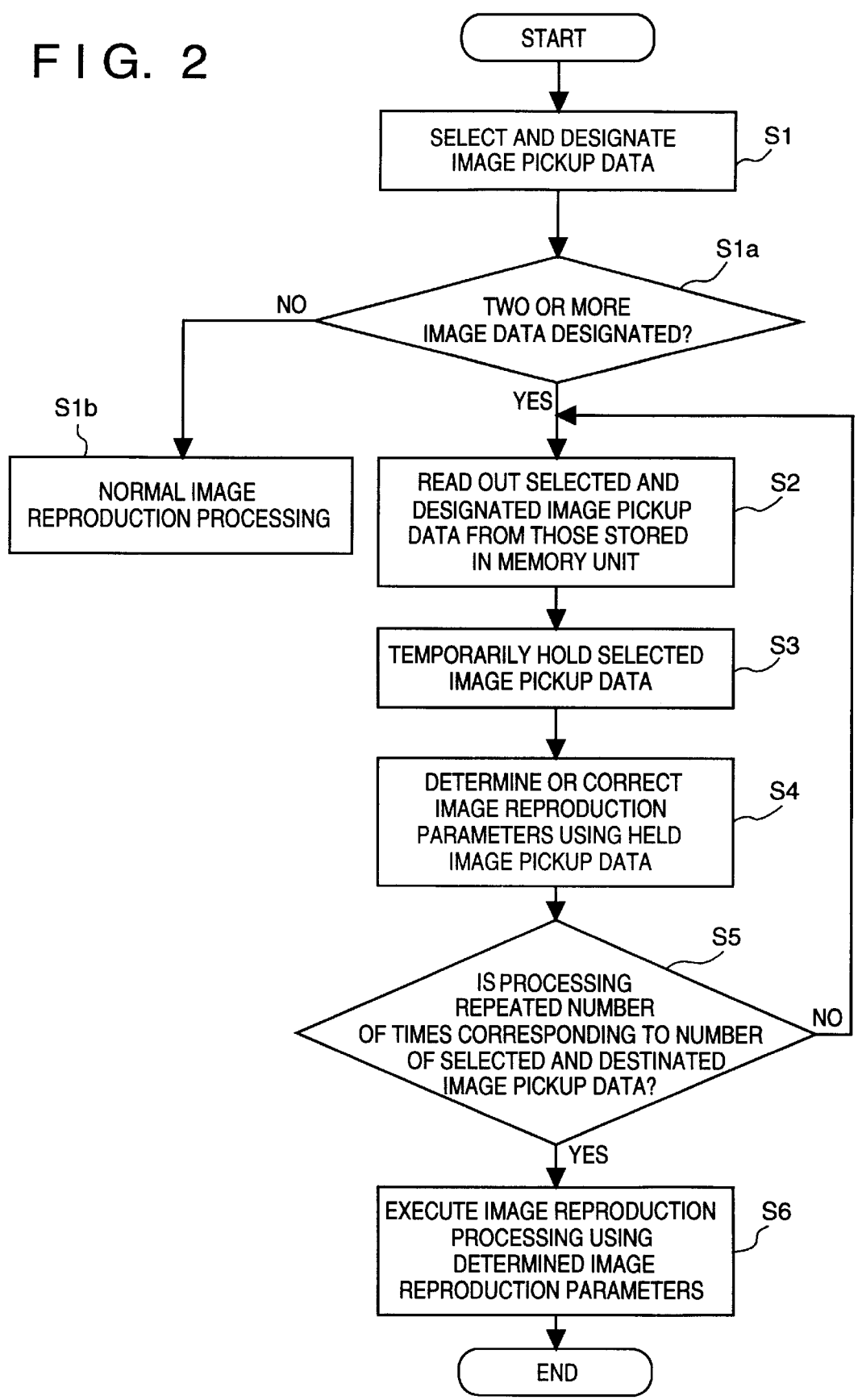
FIG. 2 is a flow chart showing the operation of the color image reproduction apparatus of the first embodiment.

The operation of the color image reproduction apparatus according to this embodiment will be described below. FIG. 2 is a flow chart showing the sequence of the image reproduction processing executed by the color-image-reproduction-processing unit 30 according to this embodiment. Note that the image-pickup-data-memory unit 20 has already stored a plurality image pickup data picked up by the color-image-pickup unit 10.

The control section 36 which controls the color-image-reproduction-processing unit 30 checks the designation contents of the image-pickup-data-selection-designation section 34 (step S1 in FIG. 2), and supplies the obtained selection designation contents to the image-pickup-data-selection section 33. In step S1a, the control section 36 checks if at least two image pickup data are designated. If only one image pickup data is designated, the image pickup data is converted into image data by normal image reproduction processing in step S1b.

If two or more image pickup data are designated, the image-pickup-data-selection section 33 selects image pickup data corresponding to the selection designation contents from those stored in the image-pickup-data-memory unit 20 on the basis of the selection designation contents designated by the image-pickup-data-selection-designation section 34, and outputs the selected data to the image-pickup-data-holding section 31 (S2).

The image-pickup-data-holding section 31 temporarily holds the selected image pickup data output from the image-pickup-data-memory unit 20 (S3).

The image-reproduction-parameter-determination section 32 analyzes the image pickup data temporarily held in the image-pickup-data-holding section 31 to acquire light source information (e.g., the color temperature, the chromaticity of a light source, or the like) upon photographing of the image pickup data, which is required in, e.g., white balance adjustment. Thereafter, the section 32 determines the image reproduction parameters on the basis of the acquired light source information (S4). In normal processing that has been conventionally used, the image reproduction parameters are fixed. However, as described above, when the image reproduction parameters are determined on the basis of image information, information necessary for determining the reproduction parameters cannot, in some cases, be sufficiently obtained (the information to be obtained includes light source information in white balance processing, or the like). In order to cope with such a case, at least two image pickup data are required. More specifically, upon completion of step S4, it is checked in step S5 if the processing in steps S2 to S4 is repetitively executed in turn in correspondence with the number of image pickup data selected in step S1. Note that the image-reproduction-parameter-determination section 32 modifies and improves the image reproduction parameters obtained in step S4. After the above-mentioned repetitive processing is performed in correspondence with the number of selected image pickup data, the image-reproduction-parameter-determination section 32 finally determines and fixes the image reproduction parameters, and supplies the determined parameters to the image-reproduction-processing section 35.

The image-reproduction-processing section 35 converts the image pickup data held in the image-pickup-data-holding section 31 into image data, using the finally determined and fixed image reproduction parameters (S6).

The operation contents in the image-reproduction-parameter-determination section 32 will be explained below while taking the determination process of a white balance coefficient as one of image reproduction parameters as an example.

Figure 3:
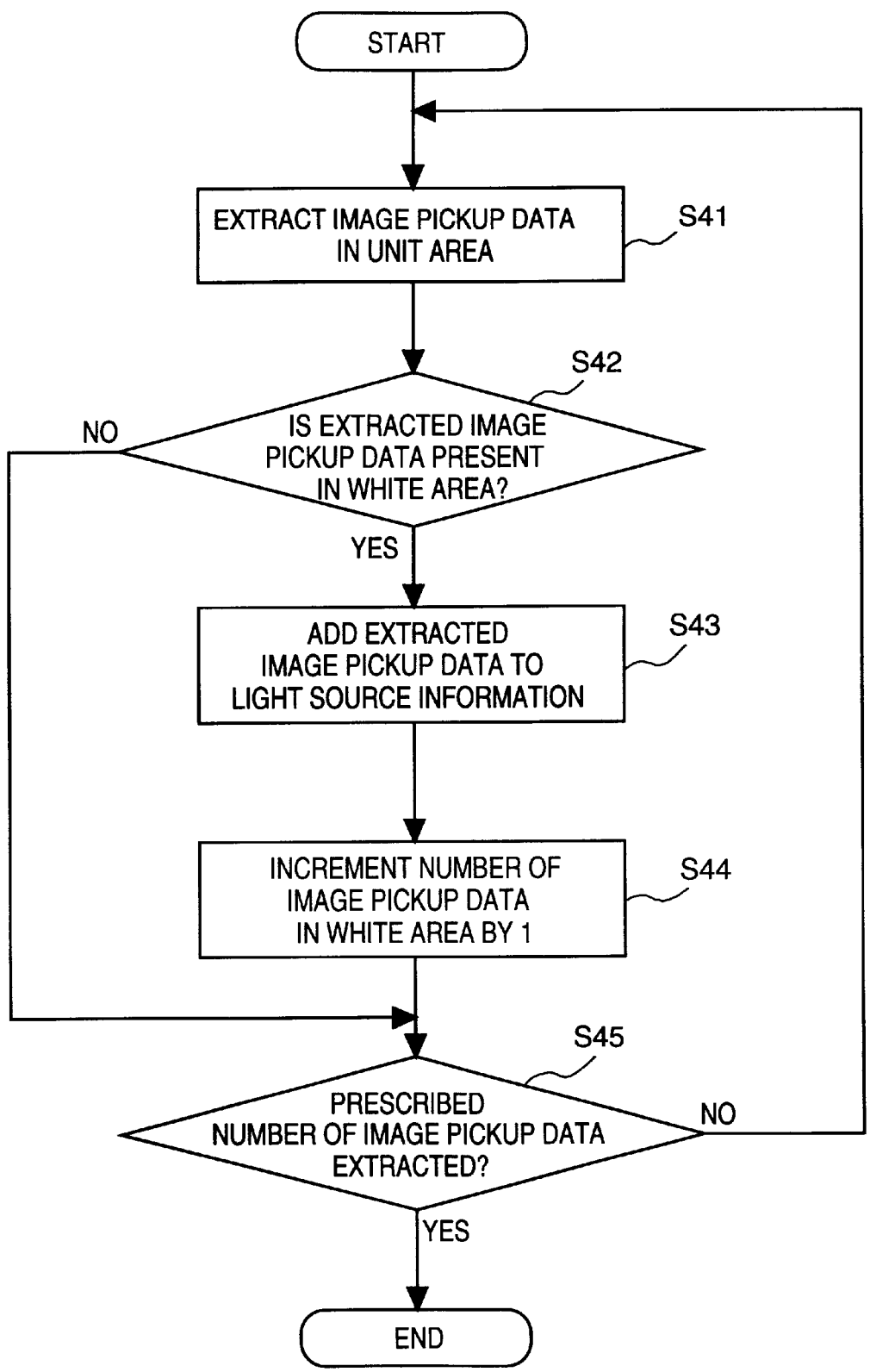
FIG. 3 is a flow chart showing the parameter determination processing sequence in the first embodiment.

FIG. 3 is a flow chart showing the processing sequence executed upon determination of the white balance coefficient in the image-reproduction-parameter-determination section 32. Note that this sequence is executed in the processing of step S4 shown in FIG. 2.

The image-reproduction-parameter-determination section 32 extracts image pickup data in a unit area having a predetermined size from those held in the image-pickup-data-holding section 31 (S41).

It is checked if the extracted image pickup data is present in a predetermined white area (illumination light source color area) (S42).

If the extracted image pickup data is present in the white area, the extracted image pickup data is added to light source information (S43). More specifically, sums of color component data obtained from the extracted image pickup data are calculated in units of color components, and the white balance coefficient is determined on the basis of the finally obtained color component data.

Then, the number of image pickup data in the white area is incremented by 1 (S44), and it is checked if image pickup data for a prescribed number of unit areas is extracted from the image pickup data (S45).

If it is determined in step S42 that the extracted image pickup data is not present in the white area, the flow skips steps S43 and S44, and judgment step S45 is executed.

If it is determined in step S45 that image pickup data for a prescribed number of unit areas is not extracted, steps S41 to S45 are repeated until image pickup data for a prescribed number of unit areas is extracted. If the prescribed number of data is extracted, this sequence ends. At this time, if the repetitive processing shown in FIG. 2 has already been executed in correspondence with the number of selected image pickup data, a white balance coefficient is determined and fixed on the basis of the light source information obtained in the above sequence. On the other hand, if the repetitive processing shown in FIG. 2 is not executed in correspondence with the number of selected image pickup data yet, the processing in steps S41 to S45 is repeated to correct (add) the light source information.

As described above, since the image reproduction parameters are determined on the basis of a plurality of image pickup data, a problem that a condition for determining the image reproduction parameters is not often satisfied when the parameters are determined based on only one image pickup data and cannot be precisely determined, can be avoided.

Therefore, image pickup data can be converted into image data using precise image reproduction parameters, thus allowing accurate image reproduction. When this processing is applied to white balance processing as a portion of image reproduction processing, a sufficient amount of light source information can be obtained. Thus, the white balance coefficient as the processing parameter of the white balance processing can be precisely determined.

(Modification)

A modification of the above embodiment will be described below.

In this modification, in order to perform image reproduction processing for reproducing an image from which information can be acquired more easily, the image-reproduction-parameter-determination section 32 shown in FIG. 1 obtains the frequency distribution diagram (e.g., histogram) of luminance levels from image pickup data, and performs luminance-distribution-smoothing processing on the basis of the luminance histogram, thus determining the image reproduction parameters.

Figure 4:
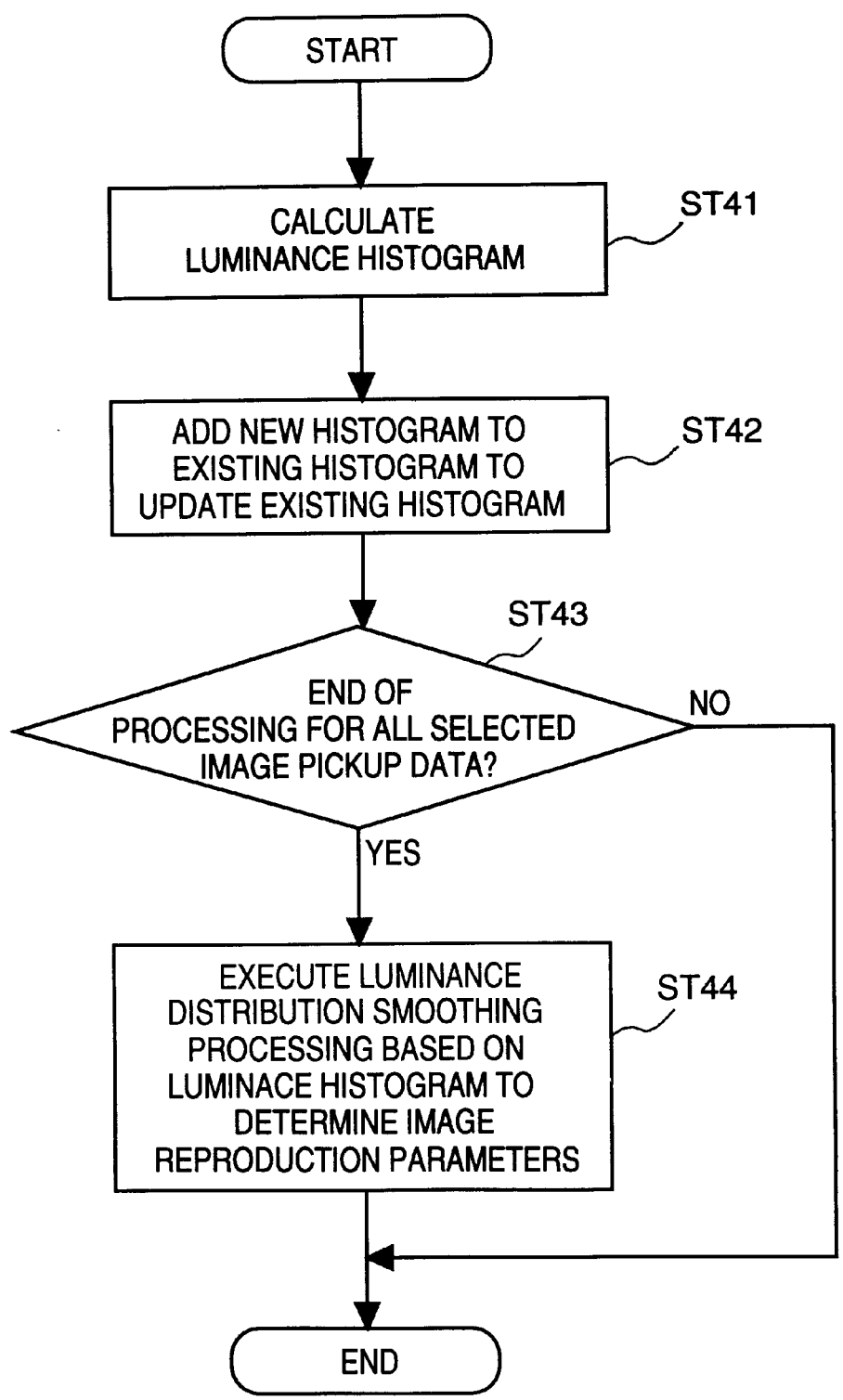
FIG. 4 is a flow chart showing the parameter determination processing sequence according to a modification of the first embodiment.

FIG. 4 is a flow chart showing the operation of the image-reproduction-parameter-determination section 32 according to this modification.

Note that this processing is executed as a portion of the processing in step S4 shown in FIG. 2. In the sequence according to this flow chart, a histogram of luminance levels is calculated based on image pickup data held in the image data holding section 31 (ST41).

Subsequently, the luminance histogram calculated in step ST41 is added to an existing luminance histogram to update the existing histogram (ST42).

It is checked if histograms are calculated from all the selected image pickup data (ST43).

If the processing is not completed for all the selected image pickup data, the flow skips step ST44, and processing according to the flow chart shown in FIG. 2 is repeated.

However, if the processing is completed for all the selected image pickup data, luminance-distribution-smoothing processing is performed using the latest luminance histogram to determine the image reproduction parameters (ST44), and this sequence ends. Thereafter, the processing in step S4 and subsequent steps shown in FIG. 2 is executed.

If a histogram is calculated in units of image pickup data, when images of a plurality of image pickup data are to be compared on the basis of luminance, the luminance changes in units of images, and image pickup data cannot be compared based on the luminance. However, when a luminance histogram is calculated for a plurality of image pickup data, and the luminance-distribution-smoothing processing is performed based on the luminance histogram to determine the image reproduction parameters, for the purpose of performing image reproduction processing, images can be compared based on luminance even it is used processed reproduced image data.

In the above embodiment and its modification, upon determination or modification of image reproduction parameters, image pickup data is read out one by one from the image-pickup-data-memory unit 20, and processing is performed. However, the present invention is not limited to this processing. For example, selected image pickup data may be simultaneously supplied to the color-image-reproduction-processing unit 30, and the color-image-reproduction-processing unit 30 may internally execute the repetitive processing or may appropriately determine the image reproduction parameters with reference to image pickup data.

In the above embodiment and its modification, the processing is repeated in correspondence with the number of selected image pickup data. However, the present invention is not limited to this processing. For example, a condition may be given in advance upon determination of the image reproduction parameters, and when this condition is satisfied, the image reproduction parameters may be fixed at that time, and the subsequent processing for determining the parameters may be interrupted to start image reproduction processing. More specifically, in the flow chart shown in FIG. 3, the step of analyzing and discriminating the number of image pickup data in the white area may be inserted between steps S44 and S45, and if the number of image pickup data in the white area exceeds a predetermined value, the sequence processing may be interrupted to end. In this case, in the flow chart shown in FIG. 2 as well, the image reproduction parameters are determined in, e.g., step S4. Even if repetition of processing is required in the next step, the repetitive processing is interrupted, and the processing in step S6 and subsequent steps is executed.

In the above embodiment and its modification, the image reproduction parameters are determined using all the selected image pickup data. Alternatively, the image reproduction parameters may be determined using specific selected image pickup data, and image reproduction processing of the selected image pickup data may be performed using the determined image reproduction parameters.

Furthermore, in the above embodiment and its modification, the image reproduction parameters are determined by equally handling all the selected image pickup data. Alternatively, upon determination of the image reproduction parameters based on image pickup data, weights may be assigned to respective image pickup data, and the image reproduction parameters may be determined in consideration of the weights. Also, as described above, a specific parameter (e.g., a parameter for describing light source information) of a large number of image reproduction parameters may be determined using specific selected image pickup data, another parameter (e.g., a knee point) may be determined using another specific image pickup data, and finally, one image reproduction parameter may be determined using all the separately determined image reproduction parameters. Then, using this image reproduction parameter, image reproduction processing of the selected image pickup data may be performed.

The gist of the present invention is to determine the image reproduction parameters used upon conversion of image pickup data into an image signal on the basis of a plurality of image pickup data. Therefore, various sequence processing operations are available without departing from the gist of the present invention. These sequence processing operations may be designed as a logic or software program or as an algorithm without departing from the gist of the present invention, and may be applied to hardware or an apparatus which operates according to this algorithm.

<Second Embodiment>

Figure 5:
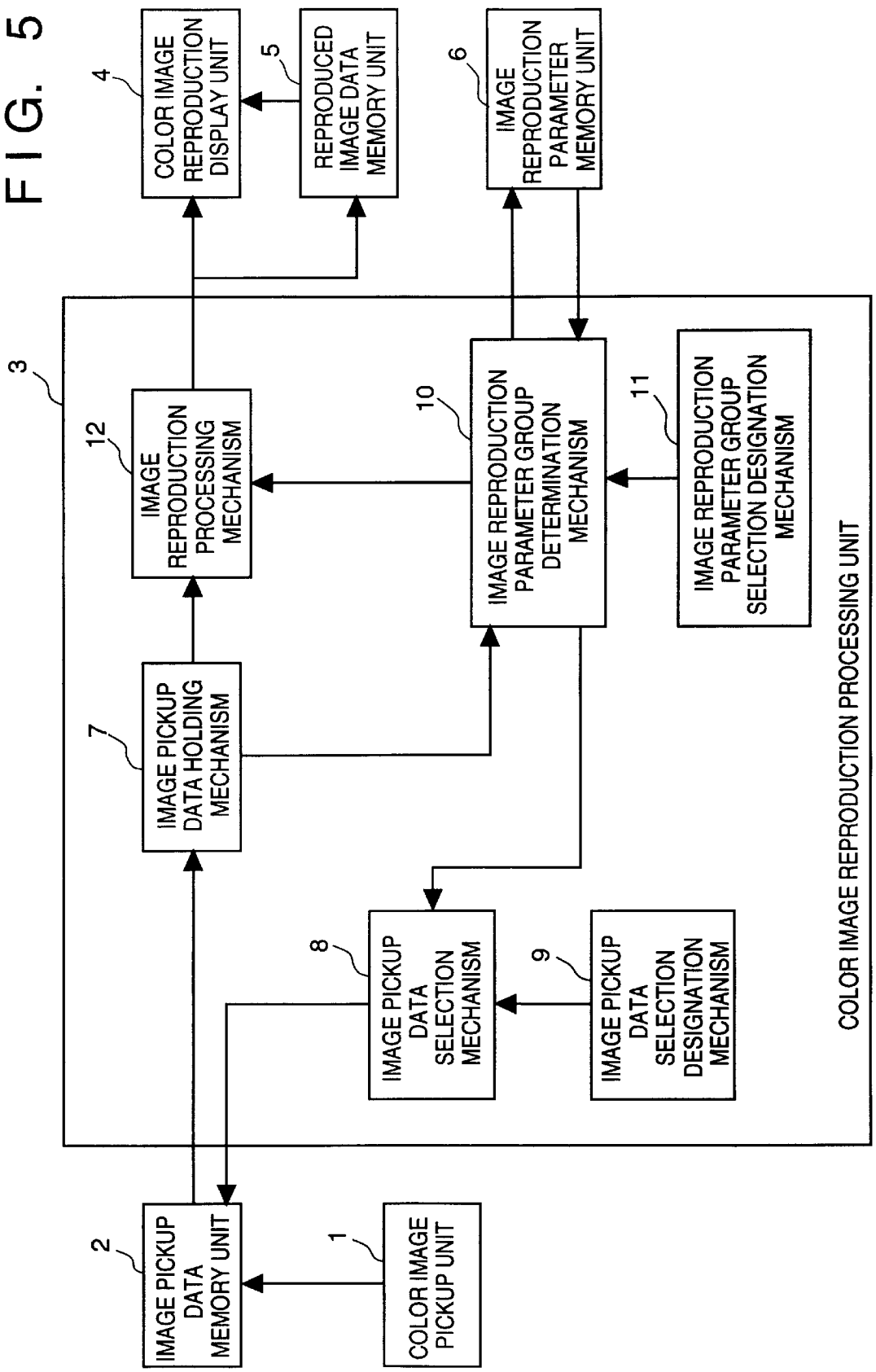
FIG. 5 is a block diagram showing the arrangement of a color image reproduction apparatus according to the second embodiment of the present invention.

FIG. 5 is a block diagram showing the arrangement of an image reproduction apparatus according to the second embodiment of the present invention.

Referring to FIG. 5, reference numeral 1 denotes a color-image-pickup unit such as a digital camera. The color-image-pickup unit 1 picks up an image of an object, and outputs the picked-up image to an image-pickup-data-memory unit 2 as two-dimensional image pickup data. The image-pickup-data-memory unit 2 stores the image pickup data supplied from the color-image-pickup unit 1.

A color-image-reproduction-processing unit 3 performs predetermined image reproduction processing of the image pickup data stored in the image-pickup-data-memory unit 2 to convert the image pickup data into, e.g., digital NTSC-RGB data, and outputs the converted digital data to a color-image-reproduction-display unit 4 and a reproduced-image-data-memory unit 5. The color-image-reproduction-display unit 4 comprises, e.g., a color video board and a monitor (neither are shown). The unit 4 receives color image data output from the image reproduction processing unit 3 or reads out color image data stored in the reproduced-image-data-memory unit 5, and displays the image data on the monitor as a color image. The reproduced-image-data-memory unit 5 stores image data reproduced by the color-image-reproduction-processing unit 3, and the stored image data is supplied to the color-image-reproduction-display unit 4 as needed.

An image-reproduction-parameter-memory unit 6 stores a desired parameter group or some of the parameters in such a group in accordance with designation information from the color-image-reproduction-processing unit 3, and supplies the stored parameters to the color-image-reproduction-processing unit 3 as needed. Note that the image reproduction parameters constituting the parameter group include parameters similar to those in the first embodiment.

The color-image-reproduction-processing unit 3 comprises an image-pickup-data-holding mechanism 7 for holding digital data from the image-pickup-data-memory unit 2, an image-pickup-data-selection mechanism 8 for selecting image pickup data stored in the image-pickup-data-memory unit 2 and controlling the unit 2 to output the selected data to the image-pickup-data-holding mechanism 7, an image-pickup-data-selection-designation mechanism 9 for designating, e.g., a selection condition of image pickup data to the image-pickup-data-selection mechanism 8, an image-reproduction-parameter-group-determination mechanism 10 for selecting or determining an image reproduction parameter group used in image reproduction processing, an image-reproduction-parameter-group-selection-designation mechanism 11 for designating a selection or determination condition of the image reproduction parameter group to the image-reproduction-parameter-group-determination mechanism 10, and an image-reproduction-processing mechanism 12 for performing image reproduction of the image pickup data using the image reproduction parameter group. The image-reproduction-parameter-group-determination mechanism 10 outputs the image reproduction parameter group or some of the parameters to the image-reproduction-parameter-memory unit 6, and receives the image reproduction parameter group or some of the parameters from the image-reproduction-parameter-memory unit 6 as needed. The parameters are supplied to the image-reproduction-processing mechanism 12, and are used upon conversion of image pickup data into image data.

Figure 6:
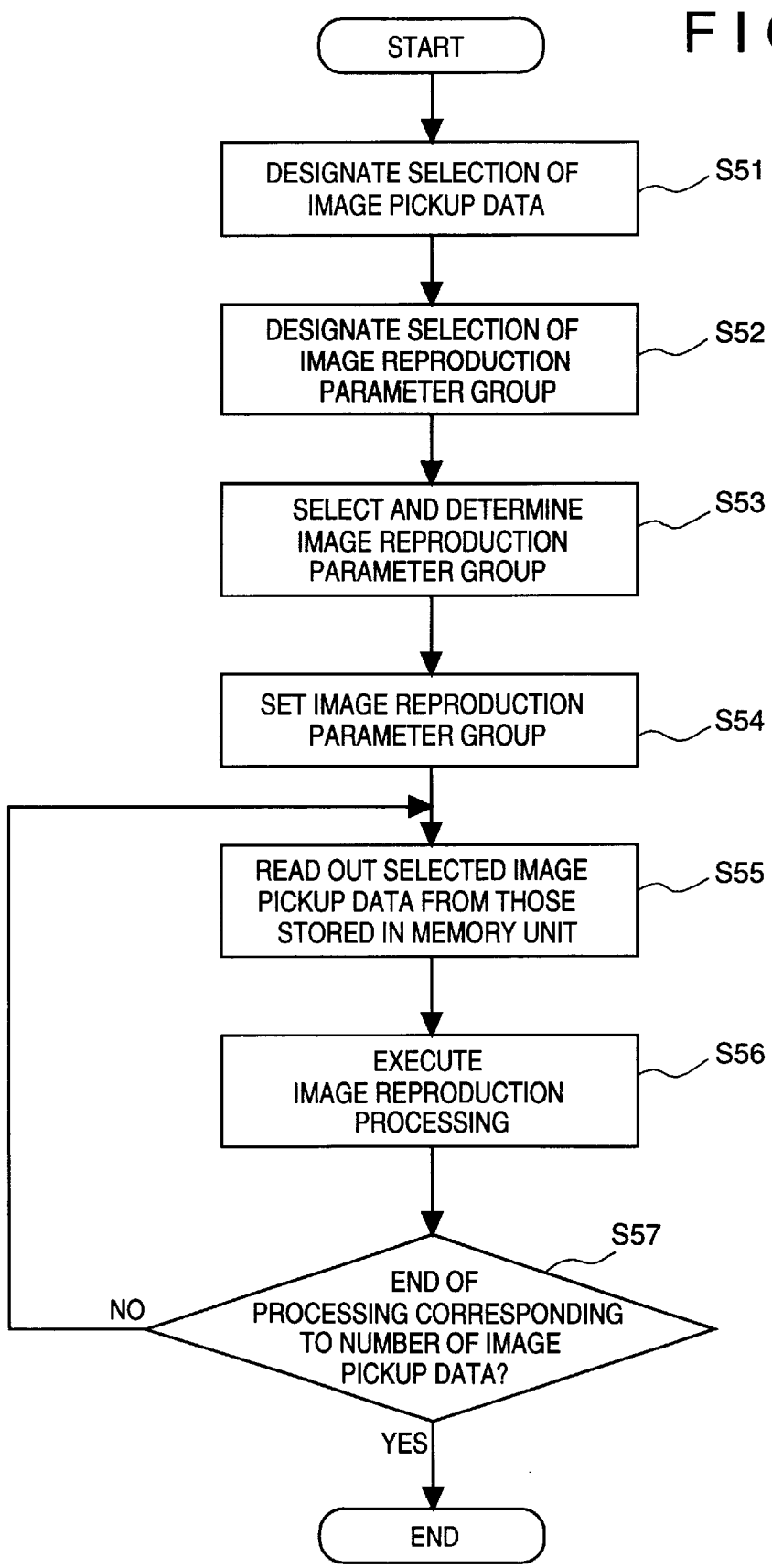
FIG. 6 is a flow chart showing the operation of the color image reproduction apparatus of the second embodiment.

FIG. 6 is a flow chart showing the image processing sequence of the image reproduction processing apparatus of this embodiment. This program is executed by the color-image-reproduction-processing unit 3. Assume that the image-pickup-data-memory unit 2 has already stored a plurality of image pickup data picked up by the color-image-pickup unit 1.

In step S51, the contents of the image-pickup-data-selection-designation mechanism 9 are checked, and the selection designation contents are supplied to the image-pickup-data-selection mechanism 8. More specifically, the image-pickup-data-selection-designation mechanism 9 designates image pickup data to be selected by inputting, e.g., a file name, or displays image pickup data stored in the image-pickup-data-memory unit 2 as a list and designates image pickup data displayed in the list by appropriately marking them. In this embodiment, at least two image pickup data are designated. In this case, if the image pickup conditions (e.g., image pickup date and time, environmental conditions, and the like) of image pickup data stored in the image-pickup-data-memory unit 2 are available as information, the selection designation is performed with reference to such information. If only one image pickup data is designated, the processing of this embodiment is not executed, and image pickup data is converted into image data by normal image reproduction processing.

In step S52, the contents of the image-reproduction-parameter-group-selection-designation mechanism 11 are checked, and the checking result is supplied to the image-reproduction-parameter-group-determination mechanism 10. As the contents of the image reproduction parameter group selection designation, for example, a plurality of image reproduction parameters such as the color temperature, the reproduction luminance level, and the like constituting the image reproduction parameter group are directly input or set. Otherwise, when image reproduction parameter group has already been stored as a group in the image-reproduction-parameter-memory unit 6, the stored image reproduction parameter group is designated. Alternatively, specific image pickup data is designated, and an image reproduction parameter group determined by analyzing the designated image pickup data is designated, or new parameters constituting an image reproduction parameter group are designated on the basis of parameters obtained based on image pickup data.

In step S53, selection designation information of the image reproduction parameter group supplied from the image-reproduction-parameter-group-selection-designation mechanism 11, is analyzed, and a desired image reproduction parameter group is selected, determined, or re-constructed by accessing the image-pickup-data-selection mechanism 8, the image-pickup-data-holding mechanism 7, or the image reproduction parameter group memory unit 6, as needed. The selected, determined, or re-constructed image reproduction parameter group is set as an image reproduction parameter group for the image-reproduction-processing mechanism 12 in step S54.

In step S55, the image-pickup-data-selection mechanism 8 selects image pickup data which matches the selection designation contents designated by the image-pickup-data-selection-designation mechanism 9 from the image pickup data stored in the image-pickup-data-memory unit 2. The desired image pickup data output from the image-pickup-data-memory unit 2 is supplied to the image-reproduction-processing mechanism 12 via the image-pickup-data-holding mechanism 7.

In step S56, image reproduction processing is performed by the image-reproduction-processing mechanism 12 in accordance with the image reproduction parameter group. In step S57, it is checked if image reproduction processing operations corresponding in number to the selected image pickup data are completed. If the image reproduction processing operations are not completed, the processing in steps S55 and S56 above is repeated. On the other hand, if the image reproduction processing operations are completed, this program ends. More specifically, by sequentially repeating steps S55 and S56, a reproduced image is obtained using an image reproduction parameter group common to a plurality of image pickup data from image reproduction parameter groups which are specified to perform optimal reproduction of the respective image pickup data.

Figure 7:
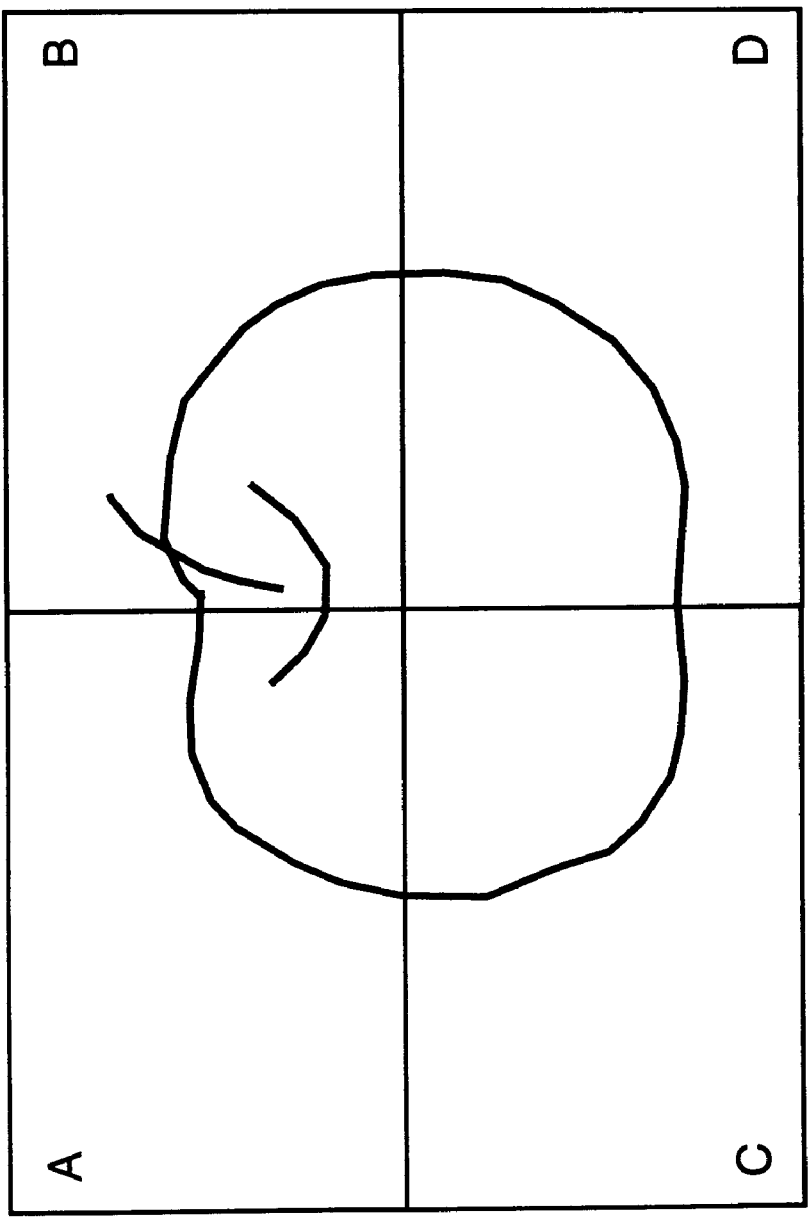
FIG. 7 is a view showing the photographing operation of an object.

FIG. 7 illustrates a case wherein an object is to be photographed using the image reproduction apparatus. FIG. 7 shows a case where the object to be photographed in one frame is divisionally photographed in four photographing areas A, B, C, and D. More specifically, in FIG. 7, the object is divisionally photographed in the four photographing areas A, B, C, and D, and four image pickup data are subjected to image reproduction. More specifically, the image reproduction parameter group used in image reproduction of these image pickup data is determined by analyzing these four image pickup data, so as to be optimal for the respective image pickup data and to hold a correlation among the four image pickup data. In other words, using the determined image reproduction parameter group as a specific image reproduction parameter group common to image reproduction processing of the four image pickup data, the image reproduction of the four image pickup data is performed.

As described above, when a specific image reproduction parameter group obtained by the method designated in advance is used as a common parameter group, and optimal image reproduction processing is performed for a plurality of image pickup data, image reproduction can be attained while utilizing the correlation among image pickup data and holding effective image information. As a result, an image can be naturally reproduced with high precision.

The present invention is not limited to the second embodiment as long as a plurality of image pickup data can be converted into image data using an image reproduction parameter group which is specified to be optimized for a plurality of image pickup data as a common image reproduction parameter group, upon conversion of image pickup data into image data. Therefore, the above-mentioned processing may be executed in various other sequence processing operations. For example, the above-mentioned processing may be executed by hardware or an apparatus which operates in accordance with a logic or software program, or an algorithm of the above-mentioned processing.

As many apparently widely different embodiments of the present invention can be made without departing from the spirit and scope thereof, it is to be understood that the invention is not limited to the specific embodiments thereof except as defined in the appended claims.

What is claimed is:

1. An image reproduction apparatus for converting an image into a scene of an image signal, and performing image reproduction processing on the scene of the image signal, comprising:

means for reproducing a plurality of scenes of image signals picked up by image pickup means from a recording medium so that each scene of image signals can be visibly reproduced;

means for designating at least two scenes of image signals from among the plurality of reproduced scenes of image signals based on predetermined conditions of images;

means for extracting correction information by analyzing the designated scenes of image signals; and correction means for correcting image reproduction parameters to be used in the image reproduction processing on the basis of the extracted correction information.

2. The apparatus according to claim 1, further comprising:

means for discriminating if the designated scenes of image signals are present in a white area which is determined in advance; and means for, when the scenes of the image signals are present in the white area, obtaining color component data on the basis of the scenes of the image signals, wherein said correction means corrects the image reproduction parameters on the basis of the color component data.

3. The apparatus according to claim 1, further comprising:

means for calculating a frequency distribution of luminance levels between the designated scenes of image signals; and means for obtaining luminance-distribution-smoothing processing using the frequency distribution of luminance levels, and wherein said correction means corrects the image reproduction parameters on the basis of a result of the luminance distribution smoothing processing.

4. The apparatus according to claim 1, wherein said correction means performs processing for correcting the image reproduction parameters the number of times which matches the number of designated scenes of image signals.

5. The apparatus according to claim 1, wherein said correction means performs processing for correcting the image reproduction parameters a predetermined number of times.

6. The apparatus according to claim 5, wherein the predetermined number of times is the number of designated scenes of image signals present in a white area which is determined in advance.

7. The apparatus according to claim 1, wherein said correction means corrects the image reproduction parameters on the basis of specific scenes of image signals of the designated scenes of image signals.

8. The apparatus according to claim 1, further comprising:

means for weighting the designated scenes of image signals, wherein said correction means corrects the image reproduction parameters on the basis of the weighted scenes of image signals.

9. The apparatus according to claim 1, wherein the image reproduction parameters include at least color temperature information, gradation information, luminance information, and white balance coefficients.

10. An image reproduction method for converting an image into a scene of an image signal, and performing image reproduction processing on the scene of the image signal, comprising the steps of:

reproducing a plurality of scenes of image signals picked up by image pickup means from a recording medium so that each scene of image signals can be visibly reproduced;

designating at least two scenes of image signals from among the plurality of reproduced scenes of image signals based on predetermined conditions;

extracting correction information by analyzing the designated scenes of image signals; and correcting image reproduction parameters used in the image reproduction processing, on the basis of the extracted correction information.

11. An image reproduction apparatus for converting an image into a scene of an image signal, and performing image reproduction processing on the scene of the image signal, comprising:

means for reproducing a plurality of scenes of image signals picked up by image pickup means from a recording medium so that each scene of image signals can be visibly reproduced;

means for selecting at least two scenes of image signals from among the plurality of reproduced scenes of image signals based on predetermined conditions;

means for selecting an image-reproduction-parameter group to be used in the image reproduction processing which corresponds to the scenes of the image signals; and processing means for performing the image reproduction processing on the selected scenes of image signals in accordance with parameters in the image-reproduction-parameter group, wherein said processing means performs the image reproduction processing using the image-reproduction-parameter group common to the selected scenes of image signals the number of times which matches the number of selected scenes of image signals.

12. The apparatus according to claim 11, wherein the parameters constituting the image-reproduction-parameter group include at least color temperature information, gradation information, luminance information, and white balance coefficients.

13. An image reproduction method for converting an image into a scene of an image signal, and performing image reproduction processing on the scene of the image signal, comprising:

the step of reproducing a plurality of scenes of image signals picked up by image pickup means from a recording medium so that each scene of image signals can be visibly reproduced;

the step of selecting at least two scenes of image signals from among the plurality of reproduced scenes of image signals based on predetermined conditions;

the step of selecting an image-reproduction-parameter group to be used in the image reproduction processing which corresponds to the scenes of the image signals; and the processing step of performing the image reproduction processing on the selected scenes of image signals in accordance with parameters in the image-reproduction-parameter group, wherein the processing step includes the step of performing the image reproduction processing using the image-reproduction-parameter group common to the selected scenes of image signals the number of times which matches the number of selected scenes of image signals.

* * * * *